(No Model.)
F. J. PATTEN.
SYSTEM OF ELECTRICAL DISTRIBUTION.
No. 418,653. Patented Dec. 31, 1889.
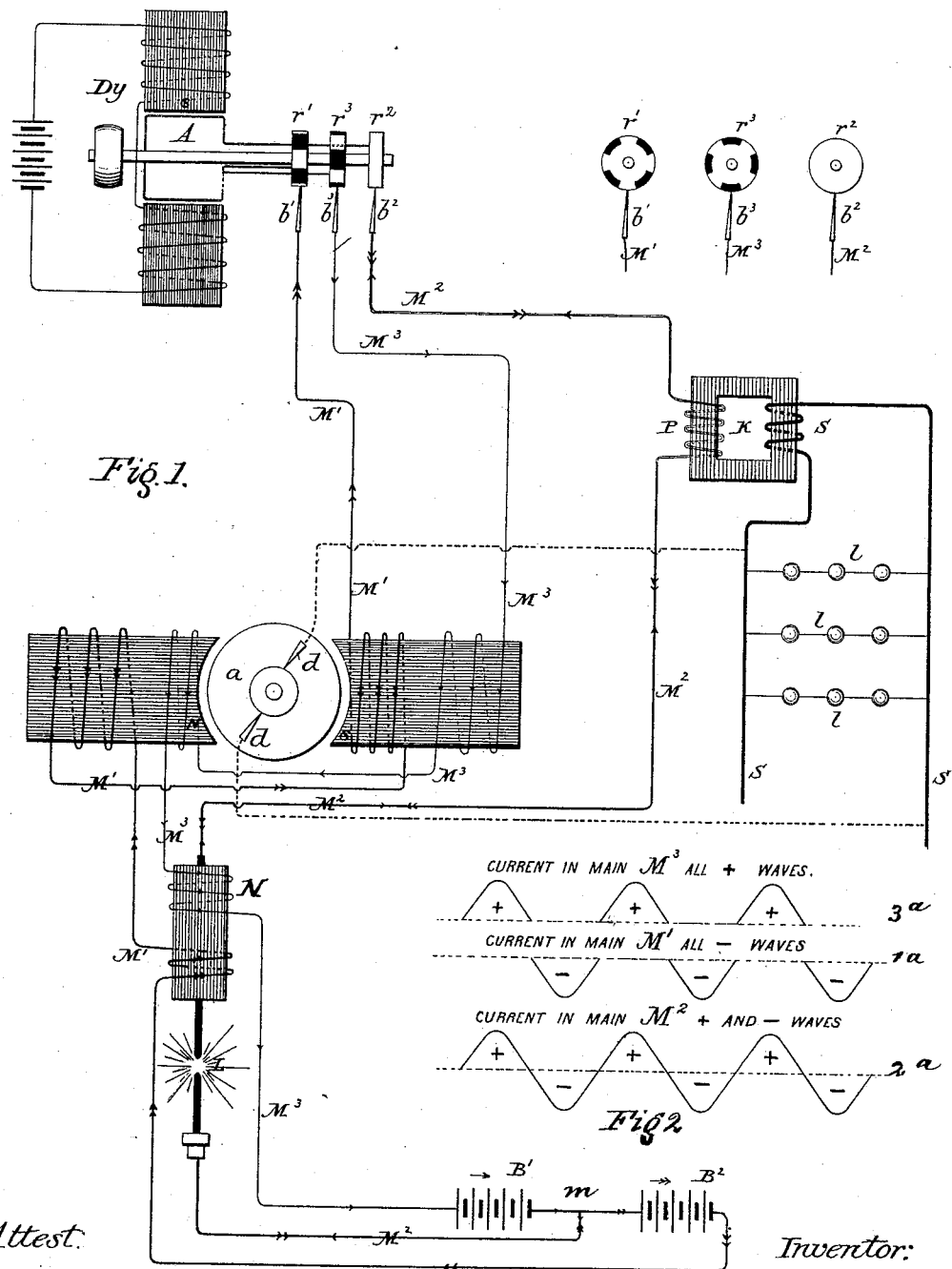

UNITED STATES PATENT OFFICE.

FRANCIS JARVIS PATTEN, OF NEW YORK, N. Y.

SYSTEM OF ELECTRICAL DISTRIBUTION.

SPECIFICATION forming part of Letters Patent No. 418,653, dated December 31, 1889.

Application filed November 11, 1889. Serial No. 329,962. (No model.)

*To all whom it may concern:*

Be it known that I, FRANCIS JARVIS PATTEN, a citizen of the United States, residing in the city, county, and State of New York, have invented certain new and useful Improvements in the Generation of and Systems for Distributing Electric Currents, of which the following is a description.

Referring to the drawings, Figure 1 is a general view of the system, showing by diagram the operative parts and circuits. Fig. 2 illustrates the current phases in different mains.

In a former application, filed November 9, 1889, Serial No. 329,775, I have shown a similar method of distribution on a four-wire plan or complete double metallic circuit system.

In the present application I desire to show a system and method of distribution by which the same result is obtained with three wires instead of four, one common return-wire serving to complete the circuit for each of the others in rapid succession. This system will be understood from the drawings. A dynamo-generator $Dy$ $Dy$, Fig. 1, has its armature or generating circuit A connected as follows: one terminal to the continuous ring $r^2$ and the other terminal to the broken rings $r'$ and $r^3$, provided with insulating-spaces equal in number to the field-poles of the machine, and these rings are so placed on the spindle with reference to fixed brushes bearing on them that the insulating-segments in one correspond accurately in position to the conducting-segments of the other. Three main leads $M'$, $M^3$, and $M^2$ are connected to the armature-circuit A through the brushes $b'$, $b^3$, and $b^2$, bearing on the rings, and from these connections it results that the main $M^2$ will receive a true alternating current, as represented by the alternating waves at $2^a$ in Fig. 2, and one of the other circuits, as $M^3$, will receive all the plus or positive waves, and the other $M'$ all the negative or minus waves. Thus the diagram $1^a$, Fig. 2, pictures the current in circuit $M'$, and the diagram $3^a$ pictures those currents flowing in circuit $M^3$. As a true alternating current circulates in the circuit $M^2$, devices requiring such a current, as the primary of a transformer, may be connected in this circuit, as shown at K, and a low-tension alternating current may be taken from its secondary, and devices may be connected in this circuit that require a low-tension alternating current, as the lamps at 1 1, or the motor-armature $a$. Other devices requiring a high-tension alternating current, as the arc light at L, may be connected in the main $M^2$. The currents in the circuits $M'$ and $M^3$ are intermittent currents of a single direction, one having all positive impulses and the other all the negative impulses of the complete wave shown at $2^a$, Fig. 2. From this it follows that the effects of a direct current may be obtained by suitably combining the circuits $M'$ and $M^3$. Thus the two circuits $M'$ and $M^3$ may be wrapped together as independent coils around each of the field-cores N and S of the motor, and if one is wound in a reverse sense to the other the intermittent currents in both circuits will maintain a field of single or unchanged polarity between the pole-pieces N and S. We can therefore maintain by these divided currents a constant or unchanged field, and with an alternating current in the armature a constant armature polarity can be maintained, as shown in previous patents granted to me, as No. 410,987, of September 10, 1889. By similar arrangement of the circuits $M'$ and $M^3$ the regulating mechanism N of the arc light L may be controlled, while the high-tension alternating current is taken through the carbons of the arc light L. Furthermore, we may by similar combinations contrive to store batteries with the alternating current in this system of distribution. Thus the main $M^2$, conveying the alternating current, is taken to a middle point of the battery B B, as $m$, and the mains $M'$ and $M^3$, conveying alternately one a plus and the other a minus wave of current, are connected to the poles of the battery, as shown, and each half receives in rapid succession a wave of current that charges that particular half.

Many other similar applications of these divided circuits will suggest themselves. I do not limit myself to those described.

Having thus described my invention, what I claim, and desire to secure by Letters Patent, is the following:

1. The method of electric distribution which consists in sending from a dynamo-electric generator all the positive impulses of current over one lead of an external circuit, and over another lead of said external circuit all the negative impulses, causing the complete alternating wave to traverse a third conductor, and in causing the current in the latter to actuate devices requiring an alternating current, and the other current or currents to actuate devices requiring a direct current.

2. In a system of electric distribution, the combination of a generator, leads conveying separately to an external circuit the positive and negative impulses of current, and a mass of iron around which the positive and negative impulses of the current are carried alternately in opposite directions and through independent coils connected in said external circuit.

3. The method of magnetizing iron by means of alternating currents, which consists in sending the positive and negative impulses of an alternating current alternately in opposite directions and through independent contiguous coils around both polar extremities of the same mass of iron.

4. The method of producing and regulating arc lights which consists in sending alternating currents through the carbon points of the arc lights, and the positive and negative impulses of the same current inversely through circuits controlling the regulating mechanism.

In testimony that I claim the foregoing as my invention I have hereunto set my name, in the presence of two witnesses, this 9th day of November, 1889.

FRANCIS JARVIS PATTEN.

Witnesses:
W. M. MINER,
GEORGE KOHLMANN.